United States Patent [19]

Euscher-Klingenhagen et al.

[11] Patent Number: 4,515,285

[45] Date of Patent: May 7, 1985

[54] VALVE PLATES FOR CONTAINER VALVES AND METHOD OF MANUFACTURING SAME

[75] Inventors: Werner Euscher-Klingenhagen, Bielefeld; Horst Griemla, Steinhagen; Hartmut Rodekamp, Bielefeld, all of Fed. Rep. of Germany

[73] Assignee: Ewald Euscher, Bielefeld, Fed. Rep. of Germany

[21] Appl. No.: 609,034

[22] Filed: May 10, 1984

[30] Foreign Application Priority Data

May 17, 1983 [DE] Fed. Rep. of Germany ....... 3317809

[51] Int. Cl.³ ...................... B21D 39/00; B65D 51/20
[52] U.S. Cl. .................................... 220/288; 220/361; 220/362; 220/66; 220/5 R; 29/512
[58] Field of Search ........ 220/66, 5 R, 85 F, DIG. 1, 220/254, 288, 361, 362; 29/510, 511, 512, 515, 516

[56] References Cited

U.S. PATENT DOCUMENTS

| | | | |
|---|---|---|---|
| 1,963,797 | 6/1934 | Mills | 220/361 |
| 2,031,838 | 2/1936 | Leonhart | 220/288 X |
| 2,210,353 | 8/1940 | Barnes | 220/288 X |
| 2,291,706 | 8/1942 | Frease | 29/512 X |
| 2,308,089 | 1/1943 | McClary | 220/288 X |
| 2,352,251 | 6/1944 | Calleson et al. | 220/362 |
| 3,124,267 | 3/1964 | Cetrone | 220/288 |
| 4,316,318 | 2/1982 | Mineo | 220/288 X |

*Primary Examiner*—Steven M. Pollard
*Attorney, Agent, or Firm*—Sprung, Horn, Kramer & Woods

[57] ABSTRACT

A valve plate is manufactured by stamping round two-ply blanks out of two superimposed strips of material and shaping the valve plate out of the blanks while retaining the double ply. The plate is provided with a dome by this process. The outer ply is now provided with threading in the vicinity of the dome. If the plate is damaged when an adaptor is subsequently screwed onto it, the damage will be confined to the outer layer.

6 Claims, 1 Drawing Figure

U.S. Patent  May 7, 1985  4,515,285
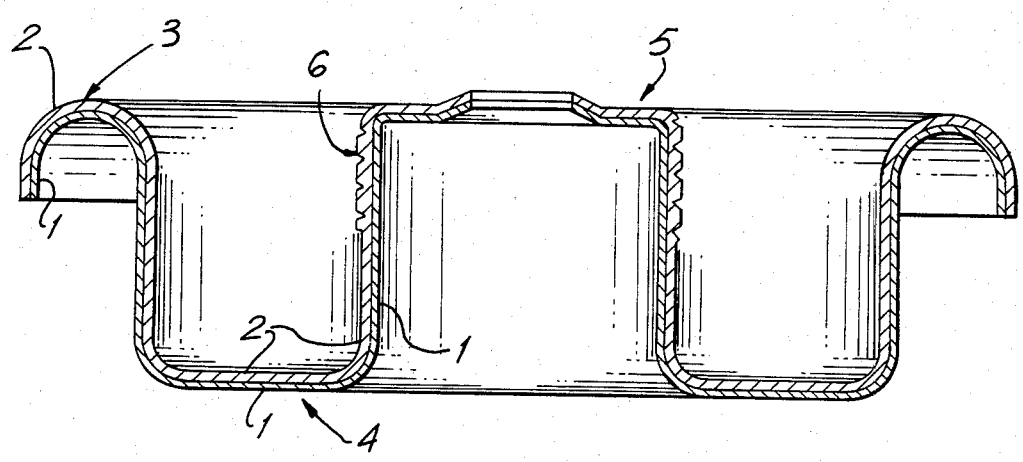

VALVE PLATES FOR CONTAINER VALVES AND METHOD OF MANUFACTURING SAME

BACKGROUND OF THE INVENTION

The present invention relates to valve plates for container valves with a threaded dome. The invention also relates to a method of manufacturing such valve plates.

Valve plates of this type are used to accommodate and secure the valves of containers, especially can-type containers The bent-under edge of the plate is fastened to the edge of the container opening and accordingly also constitutes a closure for the opening. The valve itself is accommodated in a dome in the plate.

In many engineering applications the dome of the plate is also threaded and the consumer screws on a threaded adaptor appropriate for the particular purpose.

Since valve plates of this type are relatively thin-walled, however, and since the threading decreases the strength of the material in the vicinity of the dome, the threaded section of the dome can be damaged and can begin to leak when an adaptor is screwed on. This is a safety hazard in particular when the container is used for combustible gases as in camping or in vulcanizing equipment.

SUMMARY OF THE INVENTION

The object of the present invention is to provide both a valve plate of the generic type and a method of manufacturing same that will, in a simple and highly reliable way, prevent the contents of the container from emerging unintendedly.

This object is attained with respect to the valve plate in accordance with the invention in that the valve plate is constructed in two plies by deforming two blanks together, the outer ply being provided with the threading in the vicinity of the dome.

Constructing the valve plate in two plies with the threading at the dome existing only in the outer ply ensures that the contents of the container cannot emerge unintendedly even if the threaded section is damaged by an adaptor being screwed on too tightly because, of course, the inner ply will remain intact at the site of damage. It has, surprisingly, been demonstrated that simply shaping both blanks together into a valve plate, which has a geometry characterized by different transition radii, will bond and force-fit the two blanks together so thoroughly that they will adhere tightly together with no need for additional adhesion-technology measures. No subsequent means of assembly in particular are in any way necessary.

The object is attained with respect to the method in accordance with the invention by shaping the plate in stages that include stamping it out, drawing it, shaping it, and calibrating it and by rolling the threading into the dome, characterized in-that two strips of material are superimposed, round two-ply blanks are stamped out of them, and the valve plate is shaped out of the blanks, with the double ply being retained and with the threading in the vicinity of the dome being rolled only into the outer ply.

The method of manufacturing a valve plate of this type is distinguished by extreme simplicity especially in relation say, to valve plates in which a double ply could be obtained at least in the vicinity of the dome by mounting an additional bushing on or in a conventional valve plate in the vicinity of the dome, which would demand considerable assembly operations in addition to separate manufacturing stages for the plate and for the bushing and would demand special seals between the bushing and the plate because errors in assembly etc. would considerably decrease the intended security against unintended leakage of the container contents when the dome threading is damaged.

The two plies can differ in thickness in one preferred embodiment of a valve plate in accordance with the invention.

The outer ply in particular can be thicker than the inner ply because the outer layer must be thick enough for the threading to be rolled into it easily.

In another very practical embodiment a different material can also be employed for each ply in accordance with the particular purpose.

To attain especially high strength at a low expenditure of materials, each layer can for example also be displaced in relation to the other with respect to the given fiber flow and/or structural range of the materials they are constructed out of.

BRIEF DESCRIPTION OF THE DRAWINGS

A preferred embodiment of the invention will now be described with reference to the attached drawing, wherein the FIGURE is a section through a valve plate in accordance with the invention.

DETAILED DESCRIPTION OF THE INVENTION

As will be evident from the FIGURE, the valve plate as a whole consists of two layers of material, specifically an inner ply 1 and an outer ply 2. Plies 1 and 2 accordingly both incorporate, first, the bent-down edge 3 of the valve plate, at which it is attached to the edge of the opening in a container, second, the bottom 4 of the plate, and, third, the dome 5 of the plate, inside which is accommodated the actual valve.

Dome 5 is provided with threading 6, by means of which a threaded adaptor can be screwed onto the valve. The threading 6 in this valve is applied only to outer ply 2 in the vicinity of dome 5.

If the threaded section of this embodiment of a valve plated is ever damaged by screwing the adaptor onto the valve too tightly, the damage will be confined strictly to outer ply 2 and inner ply 1 will remain unaffected, preventing the contents of the container from emerging unintendedly.

Shaping both layers 1 and 2 together force-fits them together so thoroughly that they will reliably adhere tightly together with no need for additional adhesion-technology measures.

The two-ply design of the valve plated makes it possible to make the two plies differ in thickness. In the illustrated embodiment, accordingly, outer ply 2 is thicker than inner ply 1. Outer ply 2, for example, can be about 0.35 mm thick, which is generally thick enough to allow threading 6 to be rolled in unobjectionably, and inner ply 1 can be from 0.18 to 0.2 mm thick.

A valve plate of this type, two-ply over its whole extent, is extraordinarily pressure resistant. An entirely two-ply valve plate with the dimensions just described for example has a pressure resistance up to 400% higher than that of a conventional single-ply valve plate with a previously conventional thickness of 0.4 to 0.44 mm.

Each valve plate of this type can be precisely and specifically adapted to its particular purpose, especially in relation to the particular contents of the container, by manufacturing plies 1 and 2 out of different and specifically appropriate materials.

Specific strength properties, especially with respect to also keeping the materials as thin as possible, can be attained by displacing each layer in relation to the other with respect to the given fiber flow and/or structural range of the materials they are constructed out of.

An especially simple method of manufacturing such a valve plate consists in superimposing two layers of material, two strips of sheet metal for example, and stamping round two-ply blanks out of them. These two-ply blanks are then subjected together to all the conventional drawing, bending, and calibrating processes common to manufacturing such valve plates while retaining the double ply. The threading in the vicinity of the dome is rolled only into outer ply 2.

Once processing is finished, the product will be a firmly bonded two-ply valve plate, with no necessity of any additional measures to assemble or bond the two plies together.

It will be appreciated that the instant specification and claims are set forth by way of illustration and not limitation, and that various modifications and changes may be made without departing from the spirit and scope of the present invention.

What is claimed is:

1. In a valve plate for a container valve and having a threaded dome, the improvement wherein the valve plate comprises two plies formed by deforming two blanks together, and wherein only the outer ply has the threading in the vicinity of the dome.

2. The valve plate as in claim 1, wherein the two plies differ in thickness.

3. The valve plate as in claim 2, wherein the outer ply is thicker than the inner ply.

4. The valve plate as in claim 1, wherein the two plies are composed of different materials.

5. The valve plate as in claim 1, wherein each ply is displaced in relation to the other with respect to the internal structure of the material they are composed of.

6. In a method of manufacturing a valve plate having a threaded dome, including shaping the plate in stages comprising stamping, drawing, shaping, calibrating and rolling the threading into the dome, the improvement comprising: superimposing two strips of material, stamping round two-ply blanks out of them, and shaping the valve plate out of the blanks with the double ply is retained and the threading in the vicinity of the dome is rolled only into the outer ply.

* * * * *